UNITED STATES PATENT OFFICE.

FIN SPARRE, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PRODUCTION OF ORGANIC SOLVENTS.

1,148,258.

Specification of Letters Patent. Patented July 27, 1915.

No Drawing. Application filed October 19, 1912. Serial No. 726,609.

*To all whom it may concern:*

Be it known that I, FIN SPARRE, of Wilmington, in the county of New Castle, and in the State of Delaware, have invented a certain new and useful Improvement in the Production of Organic Solvents, and do hereby declare that the following is a full, clear, and exact description thereof.

My invention relates particularly to a process of producing solvents from the paraffin hydrocarbons and derivatives thereof and especially the halogen derivatives thereof, although it is applicable also to the production of solvents from other compounds. My invention also relates to a novel mixture of solvents which is obtained by the process referred to.

The object of my invention is to provide a process for obtaining solvents having great utility, at a minimum cost and with the expenditure of a minimum amount of labor.

A further object of my invention is to produce a solvent mixture having valuable properties for use as a solvent in many different industries, but which will be particularly adapted for use in producing nitrocellulose coatings.

Still a further object of my invention is to produce a product of this kind with a small number of chemical operations, my invention being designed to dispense with the step of distillation for separating the products of the first step of the process as, for example, chlorhydrocarbons.

As indicated above, my invention is capable of being applied to many different compounds, but it is particularly applicable to the production of solvents from hydrocarbons, and especially paraffin hydrocarbons, and their derivatives.

While many examples might be supplied as embodiments of my invention, as one preferred form thereof I may proceed as follows: One of the hydrocarbon fractions, known in the trade as gasolene, naphtha, or benzin, may be used as a starting point. Assuming that the process is carried out with gasolene, the same is distilled so as to obtain the fraction boiling between 28° C. and 69° C. The fraction thus obtained will consist of pentane, isopentane, hexane and isohexanes. This product, which I will refer to as the pentanes and hexanes, is chlorinated by treatment with chlorin in the presence of light, until the proper degree of chlorination is effected. This chlorinated product will contain, among other constituents, mono- and di- chlor substitution products of the pentanes and hexanes, and perhaps some of the higher chlorhydrocarbons. It might seem desirable at this point to separate the chlorhydrocarbons by distillation, but I find it desirable and advantageous to entirely dispense with the step of distillation to separate the chlorhydrocarbons at this point in the process. It is advantageous to dispense with the step of distillation to separate chlorhydrocarbons at this point as such distillation results in breaking down some of the chlorhydrocarbons. The chlorhydrocarbons thus obtained, and without previous separation, are then subjected to the step of acetylation by treatment with sodium acetate and acetic acid in the usual manner. As a result, the liquids treated become changed over into olefins, chlorolefins, monoacetates and diacetates—for example, amylenes, hexylenes, chloramylenes, and chlorhexylenes, amyl and hexyl acetates and amylene and hexylene diacetates obtained from a treatment of chlorpentanes and chlorhexanes—and there is formed during the treatment a quantity of sodium chlorid, acetic acid, as well as a small percentage of tarry impurities. The solvent mixture is then separated from the sodium chlorid and acetic acid. The solvent mixture thus obtained comprises constituents which boil from approximately 25° C. to approximately 250° C., and the proportions of the several constituents will be found in some instances to be approximately as follows: olefins, 35%, chlorolefins, 5%, monoacetates, 50%, and diacetates, 10%.

The diacetates are excellent solvents, especially for nitrocellulose compounds, and the monoacetates are very good solvents, but have not quite the solvent power of the diacetates. The chlorolefins are poor solvents, while the olefins are non-solvent in character. The mono- and diacetates are such good solvents, however, that the olefins and chlorolefins may act as diluents thereof without causing the dissolved materials to separate out. The percentages of these several constituents are such, furthermore, as not to cause the dissolved materials to separate out and, in fact, the presence of the non-solvents and poor solvents with the good solvents increases the total amount of material which may be dissolved in the quantity of good solvents present. In this solvent mixture the olefins have boiling points approximately between 25° C. and 75° C., while the remaining constituents of the mixture are above approximately 75° C. Approximately 35% of this mixture is made up of those monoacetates present which are high boiling and the diacetates present, all of which are high boiling, while the remaining 65% of the mixture is made up of the remaining low boiling monoacetates, the chlorolefins and the olefins, the two last mentioned classes of compounds present being all low boiling. This is particularly valuable in a solvent or solvent mixture used for nitrocellulose compounds and similar compounds, as it is desirable to have the greatest percentage of the mixture of such a nature that it will evaporate quickly and therefore permit the compound to dry rapidly, but it is also exceedingly desirable to have a small percentage of the solvent evaporate slowly as thereby a tougher product is obtained. Should it be found desirable, however, the solvent mixture thus obtained may be separated by fractionation or in any other desired manner, and the several constituents thereof may be applied to any use which may be found desirable. After fractionation, the various constituents obtained may be used separately as solvents, or they may be mixed so that at least one low boiling constituent is mixed with at least one high boiling constituent, so as to approximate the desired properties of the solvent mixture desired.

While I have described my invention above in detail, I wish it to be understood that many changes may be made therein without departing from the spirit thereof.

I claim:

1. The process which comprises acetylating a halogenated mixture of pentane, hexane and their isomers, and separating out the solvent bodies thus produced.

2. The process which comprises acetylating a halogenated mixture of pentane, hexane and their isomers, separating out the solvent bodies thus produced and fractionating the solvent bodies thus obtained.

3. The process which comprises acetylating a chlorinated mixture of pentane, hexane and their isomers and separating out the solvent bodies thus produced.

4. The process which comprises acetylating a chlorinated mixture of pentane, hexane and their isomers, separating out the solvent bodies thus produced and fractionating the solvent bodies thus obtained.

5. The process which comprises acetylating a mixture of halogen derivatives of pentane, hexane and their isomers.

6. The process which comprises acetylating a mixture of chlorin derivatives of pentane, hexane and their isomers.

7. A solvent mixture comprising a chloramylene and a monoacetate.

8. A solvent mixture comprising an olefin, a halogen derivative of an olefin, a monoacetate and a diacetate.

9. A solvent mixture comprising a halogen derivative of an olefin, a monoacetate and a diacetate.

10. A solvent mixture comprising an olefin, a chlorolefin, a monoacetate and a diacetate.

11. A solvent mixture comprising a chlorolefin, a monoacetate and a diacetate.

In testimony that I claim the foregoing I have hereunto set my hand.

FIN SPARRE.

Witnesses:
W. G. TOTNALL, Jr.,
A. M. GORMAN.